United States Patent [19]

Signoret

[11] 4,246,759

[45] Jan. 27, 1981

[54] METHOD AND APPARATUS FOR CONDITIONING AIR

[75] Inventor: Jacques Signoret, Toulouse, France

[73] Assignee: ABG-Semca S.A., Toulouse, France

[21] Appl. No.: 790,674

[22] Filed: Apr. 25, 1977

[30] Foreign Application Priority Data

Apr. 28, 1976 [FR] France .................................. 76 13080

[51] Int. Cl.³ .......................... F25B 9/00; F25B 29/00; F25B 41/04; F25B 45/00
[52] U.S. Cl. ........................................... 62/77; 62/149; 62/196 B; 62/402; 165/62
[58] Field of Search ............... 165/62; 62/149, 196 C, 62/196 B, 402, 403, 77

[56] References Cited

U.S. PATENT DOCUMENTS

| | | | |
|---|---|---|---|
| 2,951,350 | 9/1960 | Etherington et al. | 62/149 |
| 3,015,939 | 1/1962 | Brainard | 62/196 B |
| 3,736,763 | 6/1973 | Garland | 62/149 X |
| 3,868,827 | 3/1975 | Linhardt et al. | 62/401 X |
| 3,932,159 | 1/1976 | Goldsberry | 62/402 |
| 3,933,004 | 1/1976 | Carter et al. | 62/196 B |

FOREIGN PATENT DOCUMENTS 487026  6/1938  United Kingdom ...................... 62/172

OTHER PUBLICATIONS

*Refrigeration and Air Conditioning*, Jordon and Priester, Prentice-Hall, Inc., New York, 1948, pp. 104–107.

Primary Examiner—Leonard E. Smith
Attorney, Agent, or Firm—Shlesinger, Arkwright, Garvey and Dinsmore

[57] ABSTRACT

A method and apparatus for conditioning air in an enclosure wherein the air is passed through a heat exchanger where the air is heated or cooled by a primary gas in the heat exchanger; the primary gas flows through a conditioning power circuit wherein the primary gas is compressed thereby heating the same; the compressed primary gas is then either passed through the heat exchanger to heat the air or is further compressed, cooled and allowed to expand to cool the primary gas which then passes through the heat exchanger to cool the air.

13 Claims, 7 Drawing Figures

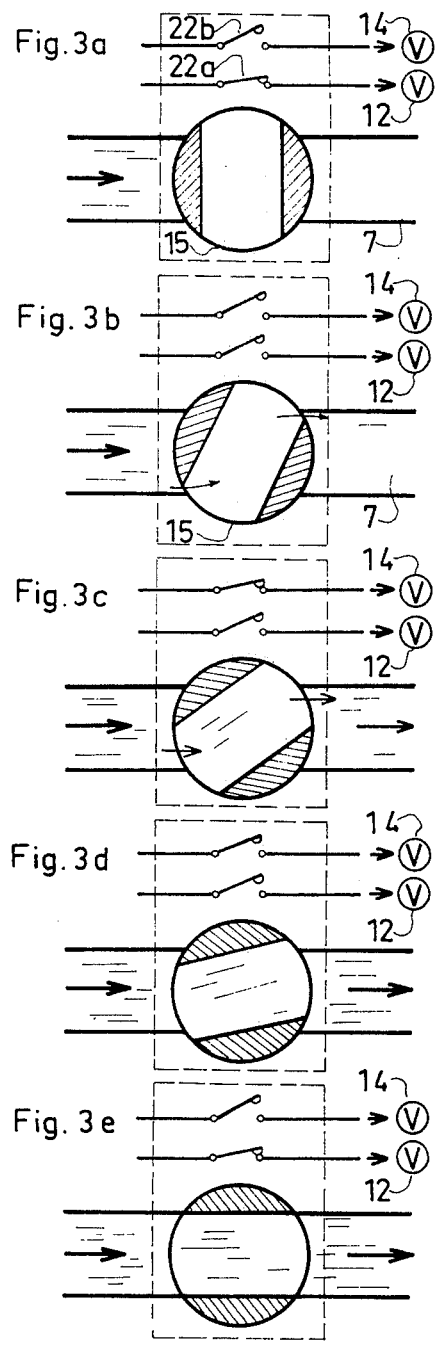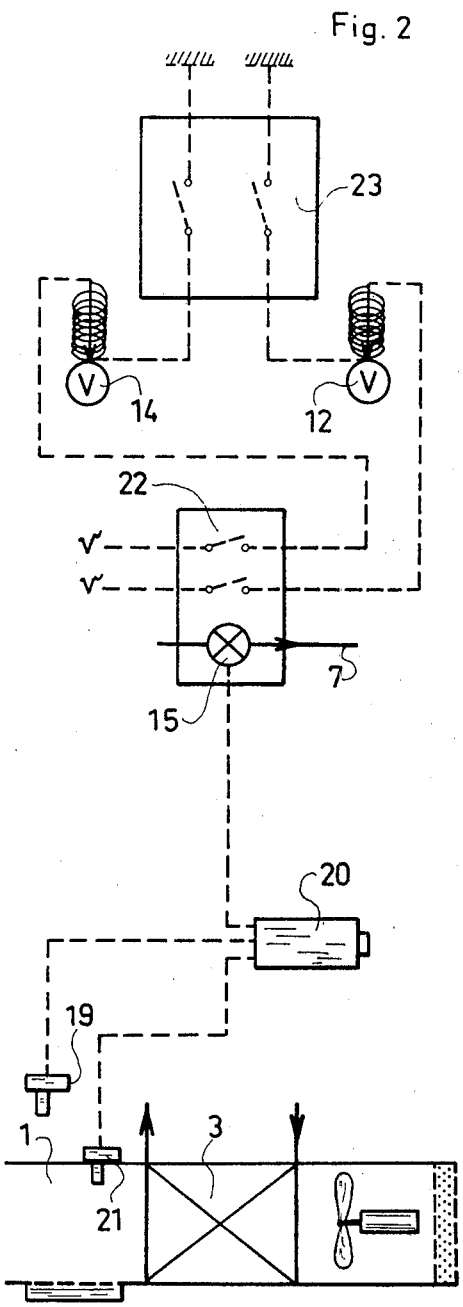

METHOD AND APPARATUS FOR CONDITIONING AIR

The invention concern a process and device for conditioning of the air in an enclosure, for example in a railroad car, aircraft structure, etc.

Conditioning devices already exist which utilize a cooling agent of the "Freon" or halogenated hydrocarbon type for cooling, to transfer the cooling power to the air of the enclosure to be conditioned. The known inconveniences of these devices are their weight and cumbersome size, the difficulties of their maintenance, and their lack of flexibility of use.

Another type of device is preferred, particularly in aircraft structures, railroad cars, etc., in which the heating or cooling power is generated by compression or expansion of the air. These devices are lighter, less cumbersome, of easier maintenance and of greater flexibility of use.

In known devices of this type, there is a great deal of power absorbed for the air conditioning and the power use remains essentially constant whatever the required power for heating or cooling. Thus, especially when that power is limited, the yield of the assembly is very poor and a large fraction of the energy absorbed is lost. This inconvenience results from the fact that regulation of the power furnished in these devices is assured by mixing a hot air, previously heated by compression, with a cold air, previously cooled by expansion, so that the power absorbed which is necessary for the heating and cooling is partially lost in the operation.

The present invention proposes a remedy for this inconvenience by disclosing a process for air conditioning with a good effectiveness whatever be the degree of power required.

The process of the invention to condition the air of an enclosure is of the type wherein the air admitted into the enclosure is passed through a conditioning exchanger to be heated or cooled, according to selected conditions, by a primary gas, particularly air, which circulates in a conditioning circuit where it absorbs an external power by compression, this called the power absorbed, to subsequently generate a heating or cooling power, called the power furnished (as opposed to power absorbed). According to the present invention, in heating regime as well as in cooling regime, the power furnished is adjusted to the value required in the conditioning exchanger by varying the flow mass of the primary gas circulating in closed circuit, so that the power absorbed by compression automatically varies in the same sense as the power furnished.

It is known that the cooling or heating power furnished by a gas in an exchanger is proportional to its flow mass; also the power absorbed by compression is proportional to the product of the flow mass multiplied by the temperature rise engendered by the compression. Thus, by varying the flow mass of the primary gas in closed circuit, the power furnished and the power absorbed are made to vary in the same sense; if, at any given instant, the power required by the cooling or heating regime decreases, the flow mass of the primary gas is reduced to adjust the power furnished to the regime level, and this reduction causes an automatic reduction of the power absorbed, so that the losses of energy are limited.

In a preferred embodiment, the primary gas flow is varied at essentially constant feed velocity, by varying the primary gas pressure in the closed circuit by intake or discharge of gas; this intake and this discharge are effected through intake electrovalve and discharge electrovalve controlled by regulation means controlled by the air temperature of the air conditioned enclosure.

For an essentially constant feed velocity of the primary gas into the closed circuit, the temperature rise caused by compression is essentially constant so that the power absorbed is directly proportional to the flow mass and thus to the power furnished. The power absorbed and the power furnished thus vary proportionally and the systems can be regulated such that the energy losses are very low whatever the conditions.

The invention extends also to an air conditioning device which is adapted to carry out the above process. This device is constituted of a closed loop air conditioning circuit comprising a conditioning exchanger, means to feed the primary gas, a cooling branch which is adapted to assure cooling of the primary air, a by-pass provided to bypass this branch, control means for the flow of primary air and adapted to direct this air toward the cooling branch or toward the by-pass, and means for regulation of the flow mass of the primary gas circulating in the closed circuit.

Other features, objects and advantages of the invention are disclosed in the following description, in reference to the attached drawings, showing a nonlimited embodiment of the invention.

FIG. 2 is a diagram of a regulation system for the device.

Figure 1:
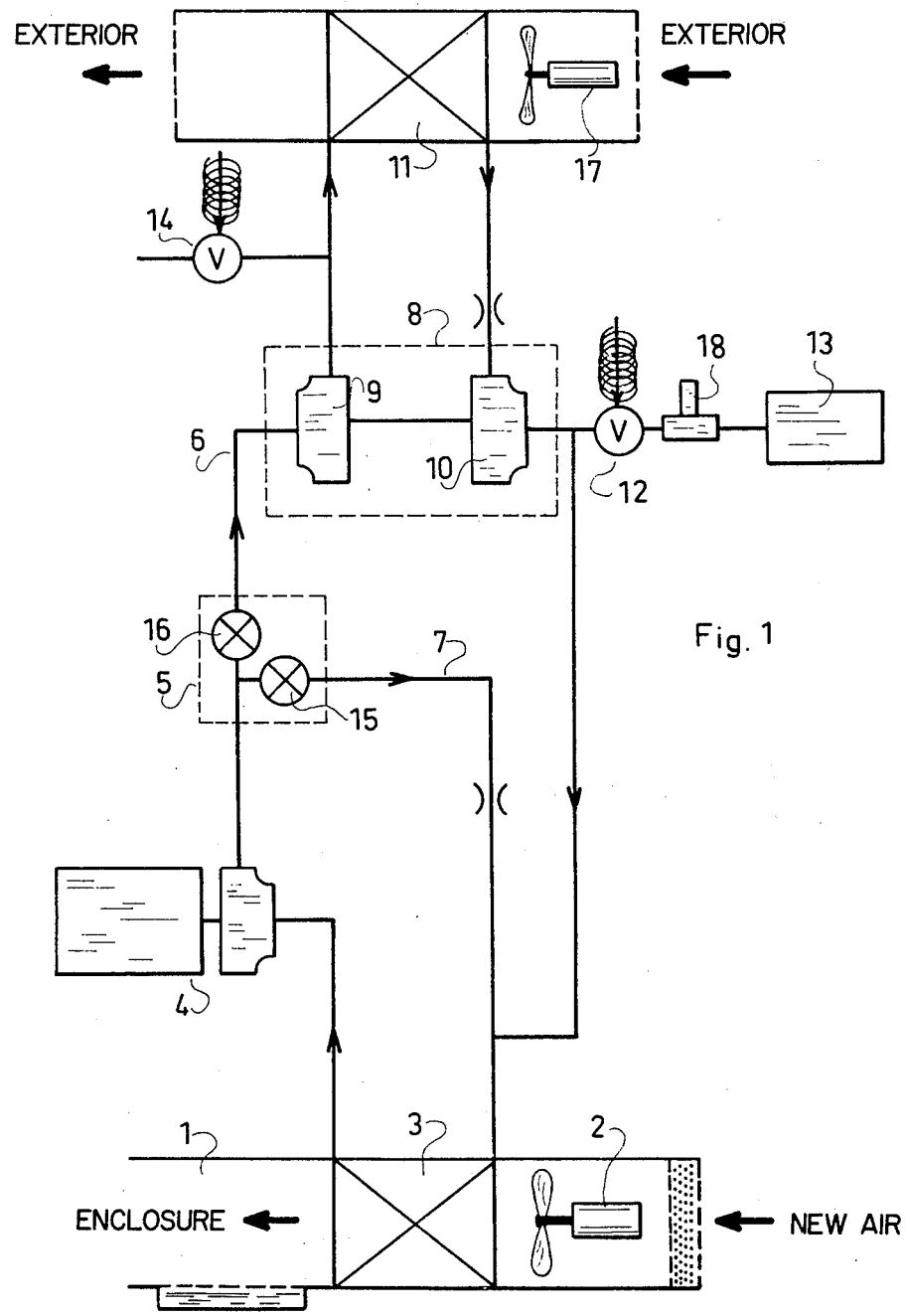
FIG. 1 is a diagram of this embodiment.

The device shown in FIG. 1 is constituted of a closed loop conditioning circuit with a pressurized primary gas, particularly air, passing through, which is used to transfer the accumulated heating or cooling power to the conditioning air to be admitted through a sheathing tubing 1 into the enclosure to be conditioned. The movement of the conditioning air is assured by a blower 2; it comes from the outside and, if desired, partially from a recirculation system with a filter.

The closed air conditioning circuit comprises:
- a conditioning exchanger 3, to transfer the heating or cooling power of the primary gas to the new air to be admitted into the enclosure,
- a compressor unit 4, especially a centrifuge, to feed the primary gas into the circuit at approximately constant speed,
- a tap system 5, adapted to direct the primary gas circulation toward a cooling branch 6 or toward a by-pass 7 which bypasses compressor 4 to the inlet into exchanger 3,
- a turbocompressor 8, inserted in cooling branch 6, and composed of a compressor 9 to compress the primary gas at the inlet into this branch and of a turbine 10 to cool the primary gas by expansion at the discharge from the branch, the work from turbine 10 being absorbed in compressor 9,
- an exchanger 11, called a heat exchanger, in branch 6 between the compressor and the turbine to relieve the primary gas of at least a part of the heat, by compression,
- an intake electrovalve 12, connected with a compressed gas source 13, to increase the gas pressure in the circuit by a determined quantity, upon command,
- a discharge electrovalve 14 to reduce the pressure in the circuit by a determined quantity, upon command.

In heating regime, the tap system 5 sends the primary gas directly to exchanger 3. This system can have two taps 15 and 16 which are joined in opposition to each other, 15 being mounted on the by-pass, and 16 mounted on the cooling branch. In heating regime, tap 15 is in open position or close to open position, and tap 16 is in closed position or close to closed position: the primary gas sent directly into exchanger 3 heats the new air admitted into the enclosure; a decrease of the pressure of the primary gas causes, on the one hand, reduction of the heating power furnished through this gas in exchanger 3, and on the other hand, a proportional reduction of the power absorbed by compression in compressor 4: the compressor is thus automatically modulated as a function of the power furnished in exchanger 3. For example, by disregarding the loss in the tubings, if the primary gas constituted of air is at 22° C. at the discharge from exchanger 3 (or at the inlet of the compressor 4) and at a temperature of 102° C. at the discharge from the compressor (or at the inlet of the exchanger), a flow of 187 g/sec is necessary to furnish a heating power of 15 kilowatts. If the power requirement decreases or increases at any given time, it suffices to reduce or increase the flow by a suitable modification of the pressure in the circuit, so that the power furnished is adjusted to the value desired, the power absorbed being subjected to a proportional variation.

In cooling system regime, the tap system 5 sends the primary gas into branch 6 where this gas is subjected to complementary compression in compressor 9, and then is relieved partially of the calories accumulated in heat exchanger 11 ventilated by blower 17, and finally undergoes an expansion which lowers the temperature, it then transfers its cooling power to the new air in exchanger 3. In the same manner as above, a decrease of the primary gas pressure causes both a reduction of the cooling power furnished by this gas in exchanger 3, and also a proportional reduction of the power absorbed in compressor 4. It is to be noted that the work produced by the expansion in turbine 10 is utilized in compressor 9 to realize a supplementary compression, which permits further discharge from the compressor. As illustration, the performances obtained in a device of this type are the following: when the primary gas, constituted of air, is at a temperature of $-17°$ C. at the inlet into exchanger 3 (discharge from the cooling branch) and at a temperature of 36° C. at discharge from the exchanger (inlet of the compressor), a flow of 465 g/sec is necessary to furnish a cooling power of 21 kilofrigories. The power absorbed in compressor 4, which corresponds to this flow, is 37 kilowatts for a rise in temperature from 36° C. to 116° C. and a pressure of 2840 millibars to 5340 millibars (absolute pressures). In compressor 9, the air is brought to a pressure of 7640 millibars and to a temperature of 167° C.; at the discharge from heat exchanger 11, it is at a temperature of 44° C. and a pressure of 7550 millibars (because of losses of charge). The turbine expands it up to a pressure of on the order of 3000 millibars, and its temperature to $-17°$ C.

In case of decrease or increase of the necessary cooling power, it suffices to reduce or to increase the flow by discharge from electrovalve 14 or intake in electrovalve 12 so that the power furnished is adjusted to the value desired, and the power absorbed is subjected to a proportional variation.

In the diagram of FIG. 1, discharge electrovalve 14 is preferably provided to assure evacuation between the discharge from compressor 9 and inlet of exchanger 11, because it is in this portion of the circuit that the pressure of the primary gas in the highest and that the action of this electrovalve is the most effective. In an analogous manner, intake electrovalve 12 is provided to assure inlet into the circuit between the discharge from turbine 10 and compressor 4, because it is in this portion of the circuit that the pressure is the lowest and that the action of this electrovalve is the easiest to assure.

A relief valve 18 is provided before this electrovalve 12 to limit the maximum pressure in the circuit; the maximum power absorbed and the maximum power furnished are thus limited to controllable values, so that the same device can serve for different power requirements, because a preregulation permits its adaptation to the desired application.

Besides, FIG. 2 shows a regulatory assembly which can advantageously control the conditioning device. The tap system is controlled by regulatory means comprising a probe 19 mounted in the enclosure being heated or cooled to detect its temperature and a regulation selector 20 adapted to compare this temperature to a predetermined value and to control the system of taps. A second probe 21 is preferably mounted in the tubing 1 immediately down from exchanger 3 to limit the extreme temperatures of the tubing; this probe sends the directed value to the regulation selector which is adapted in a traditional manner to control the tap system in the appropriate sense in the case wherein the temperature of the sheathing attains the limit of programmed values, for example 2° C. for the lowest temperature and 60° C. for the highest temperature.

The control of the taps is such that by-pass tap is actuated to open if the temperature measured by probe 19 is lower that the predetermined limit temperature, and the other tap 16 is actuated to close; in the opposite case, if the temperature measured is greater than the limit temperature, by-pass tap 15 is actuated to close and the other tap actuated to open.

The electrovalves are controlled by the position of the taps by a contact system 22 mounted in the customary manner on one of the taps, for example on by-pass tap 15.

FIGS. 3a, 3b, 3c, 3d and 3e illustrate the described method of control.

By-pass tap 15, mounted in completely closed position (FIG. 3a) corresponds to the case where there is a demand for increase of power in the cooling regime: in this position, a contact 22a is closed and assures electric feed of the intake electrovalve 12, which by opening causes an increase of the pressure of the circuit and thus of cooling power furnished and of the power absorbed.

The tap in beginning open position (FIG. 3b) corresponds, in a range extending to approximately 10° open, to the case wherein the power furnished is nearly equal to the power required for cooling regime: in this position the two electrovalves are not electrically fed, and remain closed. The precise coincidence of the power furnished with the power required is assured in this zone by the slight variations of the position of the tap, which modulate the flow of the small fraction of primary gas sent into by-pass 7.

The tap in intermediate position (FIG. 3c) corresponds, in a range extending from approximately 10° to approximately 80° open, to the case of a demand for decrease of power in the cooling regime or in heating regime: in this position the contact 22b is closed and assures the electric feed of discharge electrovalve 14 which, by opening, causes a reduction of the pressure of the circuit and thus of the powers furnished and absorbed.

The tap in the end of open position (almost completely open: FIG. 3d) corresponds in a range extending for approximately 10°, to the case wherein the power furnished is nearly equal to the power required in heating regime: in this position the two electrovalves are not receiving electrical current and remain closed. In the same manner as what occurs at the beginning of opening, slight variations of the position of the tap in this range assure the precise coincidence of the power furnished and the power required, by modulating the flow of a small fraction of primary gas which is detoured by by-pass 7 (the other tap being in the beginning open position).

The tap in completely upon position (FIG. 3e) corresponds to the case of a demand for increase of power in the heating regime: in this position the contact 22a is closed and assures an electrical feed to intake electrovalve 12 which, by opening, causes an increase of the pressure of the circuit and thus of the heating power furnished and of the power absorbed.

The actuator (not shown) for the valve 15 may include appropriate actuators for switches 22a and 22b so that the switches operate as a function of the position of valve 15 as described above.

Additionally, a timing system 23 is preferably connected with the electrovalves to time their durations and their opening frequencies in order to assure the stability of function of the device. This system comprises timed contacts which are closed and opened at regular intervals in such a manner as to generate pulses of predetermined duration and frequency; thus each electrovalve can open only during one pulse and for the duration of that pulse. Thus the oscillations of the system are reduced, because the pressure of equilibrium is established rapidly in the circuit for each new required power; once this pressure is established, the taps are positioned in a neutral zone (FIG. 3b for the cooling regime of FIG. 3d for the heating regime), in which the electrovalves are at rest, the low amplitude adjustments are realized by small variations of the position of the taps without action on the electrovalves.

Of course the present invention is not limited to the disclosures of the preceding description, but include also all possible variations.

What I claim is:

1. A process for conditioning air for an enclosure comprising passing air to be admitted to the enclosure through a conditioning exchanger for selectively heating or cooling the air, circulating a primary gas throughout a conditioning circuit, compressing said primary gas whereby said primary gas absorbs external energy, directing said compressed primary gas to a first portion of said conditioning circuit, a second portion of said conditioning circuit or partially into said first and second portions, said first portion conveying said compressed primary gas to said conditioning exchanger for heating air passing into said enclosure, said second portion conveying said primary gas through a compressor for future compressing said primary gas, an ambient air heat exchanger for cooling said further compressed primary gas and an expansion turbine for further cooling said primary gas to said conditioning exchanger for cooling air passing into said enclosure, varying the flowing mass of the primary gas in said conditioning circuit so that the energy absorbed by said primary gas during compression is proportional to the degree of heating or cooling required in said conditioning exchanger by maintaining the velocity of the flowing gas essentially constant and varying the pressure of said primary gas in response to the temperature of the air in said enclosure by admitting additional primary gas to or releasing some primary gas from said conditioning circuit, providing bypass means responsive to the temperature in said enclosure for directing said primary gas into said first portion, said second portion or partially into said first and second portions and providing means for admitting primary gas to and releasing primary gas from said conditioning circuit and operable in response to the flow directing positioning of said bypass means.

2. A process for conditioning air for an enclosure comprising passing air to be admitted to the enclosure through a conditioning exchanger for selectively heating or cooling the air, circulating a primary gas throughout a conditioning circuit, compressing said primary gas whereby said primary gas absorbs external energy, directing said compressed primary gas to a first portion of said conditioning circuit, a second portion of said conditioning circuit or partially into said first and second portions, said first portion conveying said compressed primary gas to said conditioning exchanger for heating air passing into said enclosure, said second portion conveying said primary gas through a compressor for further compressing said primary gas, an ambient air heat exchanger for cooling said further compressed primary gas and an expansion turbine for further cooling said primary gas to said conditioning exchanger for cooling air passing into said enclosure, varying the flowing mass of the primary gas in said conditioning circuit so that the energy absorbed by said primary gas during compression is proportional to the degree of heating or cooling required in said conditioning exchanger by maintaining the velocity of the flowing gas essentially constant and varying the pressure of said primary gas in response to the temperature of the air in said enclosure by admitting additional primary gas to or releasing some primary gas from said conditioning circuit, providing bypass means responsive to the temperature in said enclosure for directing said primary gas into said first portion, said second portion or partially into said first and second portions, providing electrovalves for said primary gas admitting and releasing, and operating said electrovalves in response to the flow directing positioning of said bypass means.

3. A process as in claim 2 and wherein said primary gas is air.

4. An apparatus for conditioning air for an enclosure by selectively heating or cooling the air comprising a heat exchanger wherein heat is transferred between the air and a primary gas circulating throughout a conditioning circuit, a compressor for compressing and thereby heating said primary gas, valve means for selectively directing the compressed primary gas into a first circuit, a second circuit or partially into said first and second circuits, said first circuit conveying said compressed primary gas to said heat exchanger for heating air flowing into said enclosure, said second circuit conveying said compressed gas through a system for cooling said primary gas, said system comprising a turbocompressor for further compressing said primary gas, ambient air heat exchange means for cooling said further compressed gas, means conveying said primary gas from said heat exchange means to said turbocompressor for expansively driving said turbocompressor and cooling said primary gas, means for conveying said cooled primary gas to said heat exchanger for cooling air flowing into said enclosure, means for admitting additional primary gas into said conditioning circuit and means for releasing primary gas from said power circuit, said admitting means and said releasing means being operable to control the flowing mass of said primary gas in said conditioning circuit so that the energy absorbed by said primary gas during compression is proportional to the degree of heating or cooling required in said heat exchanger, and said admitting means and said releasing means each include electrovalves operable in response to the position of said valve means.

5. An apparatus as in claim 4 and wherein said primary gas is air.

6. Conditioning apparatus as in claim 4 wherein the admitting electrovalve is provided so as to assure admission of gas into the circuit between the discharge from the turbine and the inlet from the compressor.

7. Conditioning apparatus as in claim 4, wherein the release electrovalve is equipped to assure the evacuation between the discharge from the compressor of the turbocompressor and the inlet of the heat exchanger.

8. An apparatus as in claim 4 and wherein said valve means is operable in response to temperature variations in said enclosure.

9. Conditioning apparatus as in claim 8, wherein said valve means is controlled by regulation means comprising a probe mounted in the enclosure for detecting the temperature thereof and a regulation selector adapted to compare this temperature to a fixed limit value and to control the valve means.

10. Conditioning apparatus as in claim 9, wherein the regulation means include a second probe immediately downstream from the conditioning exchanger in an air duct and the regulation selector is adapted to limit the temperatures of the air duct from the value furnished by this second probe.

11. Conditioning apparatus as in claim 10, wherein said valve means includes two taps coupled in opposition to each other, one on said second circuit, the other on said first circuit.

12. Conditioning apparatus as in claim 11, wherein each electrovalve is controlled by the position of the taps by a system of contacts mounted on one of them.

13. Conditioning apparatus as in claim 12, and including a timing system connected to the electrovalves to time their duration and their frequency of opening.

* * * * *